United States Patent [19]

O'Connell et al.

[11] Patent Number: 5,636,265
[45] Date of Patent: Jun. 3, 1997

[54] RADIO TELEPHONE WITH AUTOMATIC ANSWERING

[75] Inventors: Donal O'Connell, Camberley; Michael Overy, Medstead, both of England

[73] Assignee: Nokia Mobile Phones (U.K.) Limited, Camberley, United Kingdom

[21] Appl. No.: 872,021

[22] Filed: Apr. 22, 1992

[30] Foreign Application Priority Data

Apr. 25, 1991 [GB] United Kingdom ............... 9108867

[51] Int. Cl.⁶ .................. H04M 11/00; H04B 7/00; H04B 1/04; H04B 1/16
[52] U.S. Cl. ................. 379/58; 379/59; 379/61; 455/38.3; 455/127; 455/343
[58] Field of Search ................... 379/58, 59, 61, 379/63, 420, 67, 88; 455/38.3, 89, 127, 343

[56] References Cited

U.S. PATENT DOCUMENTS

| | | | |
|---|---|---|---|
| 4,852,147 | 7/1989 | Suzuki | 379/58 |
| 4,870,676 | 9/1989 | Lewo | 379/58 |
| 4,875,229 | 10/1989 | Palett | 379/58 |
| 4,933,963 | 6/1990 | Sato et al. | 379/58 |
| 4,962,523 | 10/1990 | Tanaka | 379/61 |
| 4,962,524 | 10/1990 | Murata et al. | 379/61 |
| 5,036,532 | 7/1991 | Metroka et al. | 455/127 |
| 5,054,115 | 10/1991 | Sawa et al. | 379/61 |
| 5,058,150 | 10/1991 | Kang | 379/63 |
| 5,063,589 | 11/1991 | Tsushima | 379/67 |
| 5,081,668 | 1/1992 | Ito | 379/61 |
| 5,138,651 | 8/1992 | Sudo | 379/420 |
| 5,170,491 | 12/1992 | Murata | 455/343 |
| 5,212,836 | 5/1993 | Matsushita | 379/58 |
| 5,379,338 | 1/1995 | Umemoto et al. | 379/420 |

FOREIGN PATENT DOCUMENTS 0342049  11/1989  European Pat. Off. .

OTHER PUBLICATIONS

Japanese Abstract, JP 62281648, May 24, 88.
Patent Abstracts of Japan, vol. 12, No. 174, May 24, 1988 (JP 62281648).
Patent Abstracts of Japan, vol. 16, No. 280, Mar. 4, 1992 (JP 4068948).

*Primary Examiner*—Curtis Kuntz
*Assistant Examiner*—Vijay Shankar
*Attorney, Agent, or Firm*—Perman & Green, LLP

[57] ABSTRACT

A mobile telephone operated from a vehicle battery comprises an input line for providing a signal indicative of the ignition stage of the vehicle. The telephone has a menu facility for selecting an automatic answer mode. The telephone goes off-hook automatically after a predetermined interval if the automatic answer mode has been selected and the signal on input line (11) indicates that the ignition is turned on. An incoming call can thus be answered without the user having to physically touch the telephone. On the other hand the automatic answer mode is not enabled when the ignition is off, i.e when the telephone is more likely to be unattended.

25 Claims, 2 Drawing Sheets

RADIO TELEPHONE WITH AUTOMATIC ANSWERING

FIELD OF THE INVENTION

This invention relates to a radio telephone adapted to operate from the power supply of a vehicle.

BACKGROUND OF THE INVENTION

For the sake of safety, mobile telephones installed in vehicles are now commonly adapted to operate in a so-called hands-free mode, i.e. without the need to move the handset from the cradle. The driver is thus able to make and receive calls safely without having to physically pick up and hold the handset. Usually an incoming call can be answered by pressing one of the keys on the handset, the keystroke producing an off-hook condition enabling the call to proceed.

As used herein, the term "off-hook condition" means the telephone is in a state of answering or making a telephone call.

In the further interests of road safety even the keystroke can be avoided if the mobile telephone is adapted to produce an off-hook condition automatically in response to an incoming call. However this arrangement has the disadvantage that if the subscriber is absent from the telephone at the time of an incoming call, the telephone will nevertheless go off-hook automatically. Apart from the frustration caused to the caller by the unnecessary expense of a connected call, the transceiver of the mobile telephone will become fully operational with the attendant drain on the vehicle power supply.

SUMMARY OF THE INVENTION

According to the present invention there is provided a radio telephone adapted to operate from the power supply of a vehicle, the telephone comprising answering means for automatically producing an off-hook condition in response to an incoming call depending on the ignition state of the vehicle.

A radio telephone in accordance with the invention has the advantage that the automatic answering means are conditional on the ignition state of the vehicle. Preferably the automatic answering means are enabled only if the ignition is turned on since it is then more likely that the subscriber will be in or in the vicinity of the vehicle and so the automatic completion of the call is unlikely to be abortive. On the other hand, the automatic answering means are disabled if the ignition is turned off. An incoming call may nevertheless be answered in the conventional manner by pressing a key on the telephone handset. However, a call will not be answered automatically in the absence of the subscriber if the ignition is turned off.

Preferably means are included for selectively enabling the automatic answering means. Suitably the selective enabling means are user actuable. In a preferred embodiment the enabling means comprise means for selecting one of a plurality of pre-set operating instructions stored in memory and indicated in the form of a menu on visual display means.

Also it is preferable for the automatic answering means to be adapted to produce an off-hook condition in response to an incoming call only after a predetermined interval.

In one embodiment, the radio telephone includes audio and/or visual means for indicating an incoming call, which are adapted to operate in a first mode when the answering means are disabled and in a second mode when the answering means are enabled. Hence the subscriber can readily distinguish whether or not the telephone is in automatic answer mode at the time an incoming call is received.

BRIEF DESCRIPTION OF THE DRAWINGS

An embodiment of the invention will now be described, by way of example with reference to the accompanying drawings, in which.

DESCRIPTION OF THE PREFERRED EMBODIMENT

Figure 1:
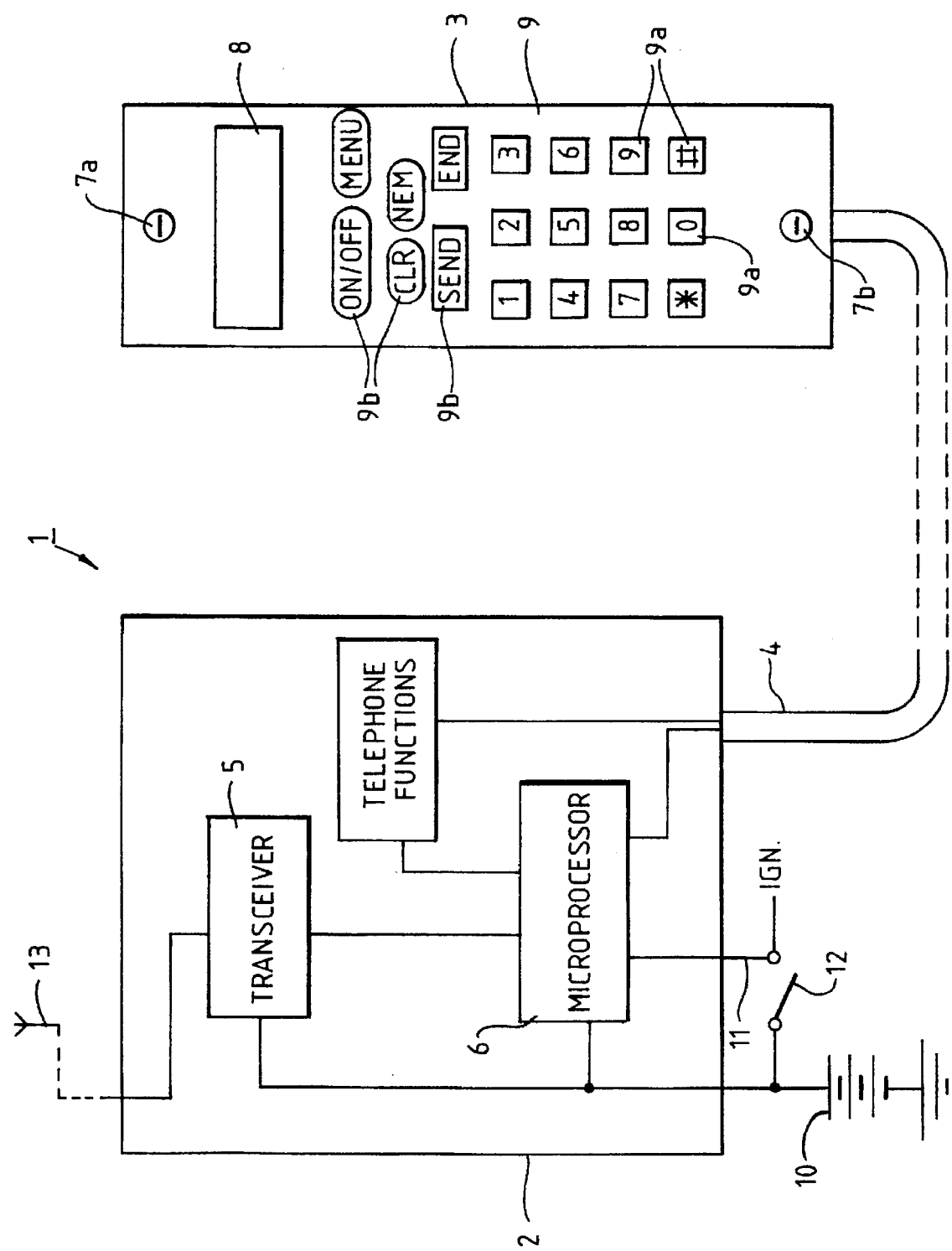
FIG. 1 is a schematic diagram of a mobile radio telephone in accordance with the invention.

The mobile radio telephone shown in FIG. 1 is a cellular telephone 1 comprising a transceiver housing 2 and a separate handset 3 coupled to the transceiver housing 2 by a cord 4. The housing 2 encloses a transceiver 5 coupled to an external antenna 13, and all the other functions conventionally found in a mobile cellular telephone, as shown schematically in FIG. 1. Since these aspects of the telephone are not directly relevant to the instant invention no further details will be given here, except to say that a microprocessor 6 is employed to control all the basic functions of the telephone 1.

The telephone 1 is intended for installation within a vehicle and is powered by the vehicle battery 10 which is coupled to the transceiver 5 and microprocessor 6 via regulators (not shown) to apply the appropriate voltages thereto.

An ignition sense line 11 is connected to the ignition switch 12 of the vehicle and is coupled to the microprocessor 6. The voltage on ignition sense line 11 is dependant on the ignition state of the vehicle. Hence the voltage on line 11 is high (e.g. +12 V) when the ignition is turned on, i.e. ignition switch 12 is closed; and the voltage on line 11 is low (e.g. 0 V) when the ignition is turned off, i.e. ignition switch 12 is open.

As is conventional, the handset comprises an earpiece 7a and mouthpiece 7b together with a display, e.g. a liquid crystal display 8, itself well-known in the art, and a keypad 9. The display is coupled to and regulated by the microprocessor 6 via the cord 4 in the usual manner. The keypad 6 essentially comprises two main sets of keys, namely alphanumeric keys 9a for dialing telephone numbers, and (optionally) for entering alphanumeric data into the telephone memories, e.g. a subscriber number index; and a set of function keys 9b for enabling various predetermined functions or operations.

As is usual in cellular telephones, the keys 9b include a "SEND" and "END" key for respectively initiating and terminating a telephone call. Another key, specifically located in the top left-hand corner is an "ON/OFF" key for turning the telephone on and off. Another of the function keys may be a menu or function key labelled, for example, "MENU" or "FUNCTION" or with a suitable abbreviation thereof. Depression of this key enables a variety of pre-set menus, the related instructions of which are stored in memory, to be viewed and selectively enabled. The various menus are selected by depressing the appropriate alphanumeric keys after depressing "MENU" or "FUNCTION" key. The relevant menu is shown to the user in words or abbreviations on the display panel 8. For example, the user may be able to select the ringing tone or prevent unauthorised outgoing calls by appropriate menu selection. Many other options may also be available via the menu facility.

In accordance with the present invention a special menu is provided to permit manual selection of an automatic answering mode. Any predetermined sequence of keystrokes may be employed to select the respective menu which may display a legend such as "AUTO ANSWER" or "NO AUTO ANSWER". The user can toggle between the two modes simply by depressing the MENU key 9b. Suitably the menu mode may be exited by pressing the "END" key of function key set 9b. When the automatic answer mode has been set it will remain enabled until the alternative mode is selected by the user in accordance with the foregoing procedure.

The operation of the automatic answering facility will now be described with reference to FIG. 2.

Figure 2:
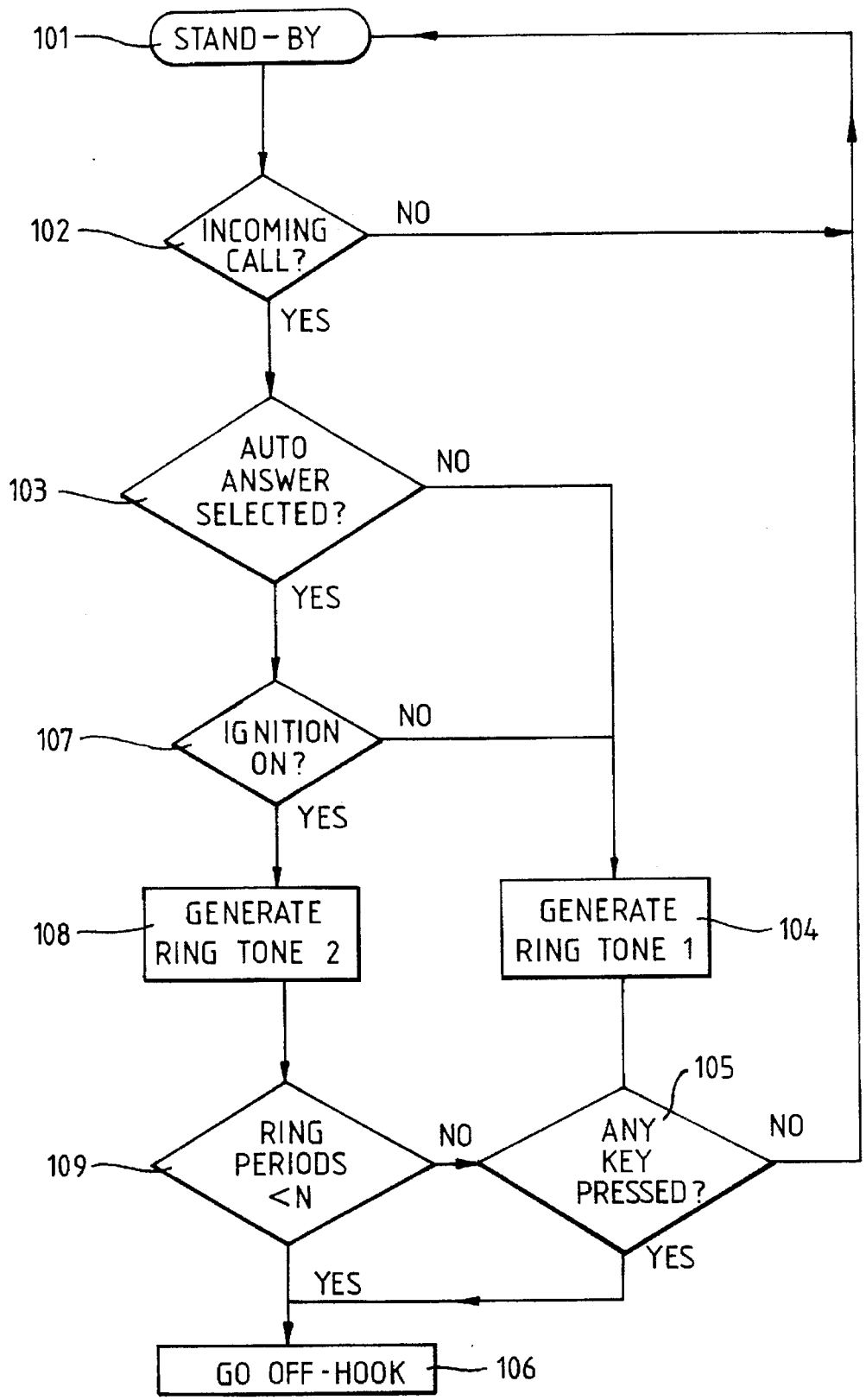
FIG. 2 is a flow-chart depicting a set of steps used by the microprocessor of the telephone in FIG. 1 for producing an off-hook condition in response to an incoming call in accordance with the present invention.

FIG. 2 is a flowchart which may be used to implement the operation of the microprocessor of FIG. 1 in relation to producing an off-hook condition automatically in response to an incoming call.

The flowchart begins at block 101 when the mobile is in a low-power stand-by mode. In this stand-by mode the telephone continually monitors whether there is an incoming call, see block 102. If there is no incoming call the telephone remains in the stand-by mode. When an incoming call is received the flow proceeds to block 103. If the automatic answering mode has not been selected the telephone generates a standard ring tone (RING TONE 1) see block 104, and the telephone behaves in the conventional manner. The audible ring tone may be accompanied by a visual indication. For example the message "CALL" may be displayed intermittently on the liquid crystal display 8 on the handset 3.

If any key 9a or 9b on the handset-keypad 6 is pressed while the call indicator is activated, see block 105, flow proceeds to block 106 and the telephone goes off-hook, i.e. enters the conversation mode, and the telephone call may proceed conventionally. If the incoming call is terminated before a key is pressed, see block 105, the telephone resumes the stand-by mode at block 101.

On the other hand if the automatic answering facility has been selected the flow proceeds from block 103 to block 107. At block 107 a check is made on the ignition state. Referring to FIG. 1 if the voltage on ignition sense line 11 is high (e.g. +12 V) the ignition is on, whereas if the voltage on line 11 is low (0 V) the ignition is off. If a low voltage is detected on the ignition sense line 11 the automatic answering mode is suppressed even when it has been specifically selected by the user. Hence the flow proceeds from block 107 to block 104.

In the same way as when the automatic answering mode has not been selected, the telephone generates a conventional ring tone (RING TONE 1) see block 104 and the telephone then behaves in the conventional manner. If any key is pressed while the telephone is still ringing, see block 105, flow proceeds to block 106 and the telephone goes off-hook, i.e. enters the conversation mode, whence the telephone call may proceed in the usual way. If the incoming call is terminated before any key is pressed, see block 105, the telephone resumes the stand-by mode at block 101.

However, if at block 107 the ignition is found to be on, i.e. +12 V on ignition sensor line 11 (see FIG. 1) flow proceeds to block 108 and the telephone generates a distinctive ring tone (RING TONE 2) to indicate to the user that the automatic answering facility is enabled. RING TONE 2 may have a different pattern, or character to RING TONE 1 and may, optionally be accompanied by a visual indication. For example the message "CALL-AUTO ANSWER" may be displayed intermittently on the liquid crystal display 8 on the handset 3.

Flow proceeds from block 108 to block 109. During the interval when the number of ring periods is less than a predetermined number N (for example three) flow proceeds to block 105. If the user presses a key during this interval the telephone will immediately go off-hook at block 105. On the other hand if no key is pressed at block 105 the flow reverts to block 101 and continues in this loop until the time out interval is exceeded, i.e. the number of ring periods exceeds N (three). At this point flow proceeds directly from block 109 to block 106 and the telephone automatically goes off-hook without any keys having been pressed, that is to say without the subscriber having any physical contact with the telephone. At this stage the telephone is in conversation mode and the call may proceed in hands-free mode without moving the handset in conventional manner.

To terminate the call, the user merely presses the "END" key 9b.

In view of the foregoing description it will be evident to a person skilled in the art that various modifications may be made within the scope of the present invention. For example the automatic answering facility may be arranged to cut-in after a predetermined period of time rather than after a pre-set number of ring cycles.

We claim:

1. In a radio telephone operated from the power supply of a vehicle, the improvement comprising:

answering means for automatically producing an off-hook condition in response to an incoming call, the automatic answering means having means, which is dependent on an ignition state of the vehicle, for preventing automatically producing the off-hook condition when the ignition state is OFF.

2. A radio telephone as claimed in claim 1, including means for selectively enabling the automatic answering means.

3. A radio telephone as claimed in claim 2, wherein the selective enabling means are user actuable.

4. A radio telephone as claimed in claim 3, wherein the enabling means comprise means for selecting one of a plurality of pre-set operating instructions stored in memory and indicated on visual display means.

5. A radio telephone as claimed in claim 4, comprising a handset, wherein the enabling means has at least one manually actuable key present externally on said handset.

6. A radio telephone as claimed in claim 5, wherein the at least one key is associated with at least one alternative function.

7. A radio telephone as claimed in claim 1, wherein the automatic answering means are adapted to produce an off-hook condition in response to an incoming call only after a predetermined interval.

8. A radio telephone as claimed in claim 1, including means for indicating an incoming call adapted to operate in a first mode when the automatic answering means are disabled and in a second mode when the automatic answering means are enabled.

9. A radio telephone as claimed in claim 1 wherein the automatic answering means are disabled when a vehicle ignition is not activated.

10. A radio telephone for operating from the power supply of a vehicle, comprising:

means for providing a signal indicative of an ignition state of the vehicle, and answering means responsive to said signal for automatically producing an off-hook condition in response to an incoming call, and means for preventing automatically producing the off-hook condition when the ignition state is OFF.

11. A radio telephone as claimed in claim 10, including means for selectively enabling the automatic answering means.

12. A radio telephone as claimed in claim 11, wherein the selective enabling means are user actuable.

13. A radio telephone as claimed in claim 12, wherein the enabling means comprise means for selecting one of a plurality of pre-set operating instructions stored in memory and indicated on visual display means.

14. A radio telephone as claimed in claim 13, comprising a handset, wherein the enabling means has at least one manually actuable key present externally on said handset.

15. A radio telephone as claimed in claim 14, wherein the at least one key is associated with at least one alternative function.

16. A radio telephone as claimed in claim 10, wherein the automatic answering means are adapted to produce an off-hook condition in response to an incoming call only after a predetermined interval.

17. A radio telephone as claimed in claim 10, including means for indicating an incoming call adapted to operate in a first mode when the automatic answering means are disabled and in a second mode when the automatic answering means are enabled.

18. A radio telephone as claimed in claim 10 wherein the automatic answering means are disabled when the vehicle ignition is not activated.

19. A radio telephone as claimed in claim 1 wherein the answering means is disabled when the ignition of the vehicle is not activated.

20. A radio telephone as claimed in claim 1 further comprising means for operating the telephone when the ignition of the vehicle is not activated.

21. A radio telephone as claimed in claim 10 wherein the answering means is disabled when the ignition of the vehicle is not activated.

22. A radio telephone as claimed in claim 10 further comprising means for operating the telephone when the ignition of the vehicle is not activated.

23. A radio telephone operated from a power supply of a vehicle comprising:

answering means for automatically producing an off-hook condition in response to an incoming call depending on an ignition state of an ignition of the vehicle, the answering means having means for preventing automatic production of the off-hook condition in response to an incoming call when the ignition is not activated; and means for operating the telephone when the ignition is not activated.

24. A radio telephone as claimed in claim 1 wherein the telephone is electrically connected to the power supply regardless of the ignition state of the vehicle.

25. A radio telephone as claimed in claim 10 wherein the telephone is electrically connected to the power supply regardless of the ignition state of the vehicle.

* * * * *